(12) United States Patent
Kleyman et al.

(10) Patent No.: US 6,373,837 B1
(45) Date of Patent: Apr. 16, 2002

(54) SYSTEM FOR TRANSMITTING DATA BETWEEN CIRCUIT BOARDS IN A HOUSING

(75) Inventors: Alexander M. Kleyman, Danville; Martin J. Horne, San Ramon, both of CA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/096,381

(22) Filed: Jun. 12, 1998

(51) Int. Cl.[7] ............................ H04Q 11/04; H04L 12/64
(52) U.S. Cl. ........................................ 370/352; 370/423
(58) Field of Search .............................. 370/352–356, 370/422, 423

(56) References Cited

U.S. PATENT DOCUMENTS

| | | | |
|---|---|---|---|
| 5,502,718 A | * 3/1996 | Lane et al. | 370/58.2 |
| 5,519,700 A | 5/1996 | Punj | 370/60.1 |
| 5,751,710 A | * 5/1998 | Crowther et al. | 370/423 |
| 5,867,480 A | 2/1999 | Thomas et al. | 370/230 |
| 5,870,394 A | 2/1999 | Oprea | 370/392 |
| 6,195,350 B1 | * 2/2001 | Accarion | 370/389 |

FOREIGN PATENT DOCUMENTS

| | | | |
|---|---|---|---|
| EP | 0 836 353 A2 | 4/1998 | H04Q/11/04 |
| WO | WO 96/23378 | 8/1996 | H04L/12/56 |

OTHER PUBLICATIONS

International Search Report for PCT Appl. No. PCT/US99/13227.

* cited by examiner

Primary Examiner—Melvin Marcelo (57) ABSTRACT

A system for transmitting data between circuit boards within a housing. The system includes a switch card placed within a housing having a plurality of slots for holding circuit boards. The switch card includes a five gigabit switching matrix having at least a first data port and a second data port for receiving data packets. A first data bus connects a first circuit board to the first data port of the switching matrix, and a second data bus connects a second circuit board to the second data port of the switching matrix. The first circuit board transmits data to the second circuit board by transmitting to the switching matrix a data packet that is addressed to the second circuit board and that contains the data. The switching matrix receives the data packet from the first circuit board, determines which circuit board the data packet is addressed to, and then transmits the data packet to the second circuit board, thereby creating a virtual connection between the first circuit board and the second circuit board, which are both within the housing.

14 Claims, 7 Drawing Sheets

FIG. 7

SYSTEM FOR TRANSMITTING DATA BETWEEN CIRCUIT BOARDS IN A HOUSING

BACKGROUND OF THE INVENTION

1. Field of the Invention

The present invention generally relates to the field of data communications, specifically, data communications between circuit boards within the same housing.

2. Related Art

Data communications has become a pervasive part of every day life and it's expected that personal computers (PCS) and modems will one day be as ubiquitous as televisions are today. Millions of people world wide use their PCS and modems to share and access information on the Internet or public on-line service. To connect to the Internet or other network, a person utilizes the services of a Network Service Provider (NSP). An NSP deploys and maintains the hardware that enables a person with a computer and modem to connect to the Internet or other network. The hardware provided by an NSP for enabling a person to connect to the Internet is called a terminal server. A person uses their modem and the public switched telephone network (PSTN) to connect to an NSP's terminal server. The terminal server provides the necessary connectivity to the Internet.

Figure 1:
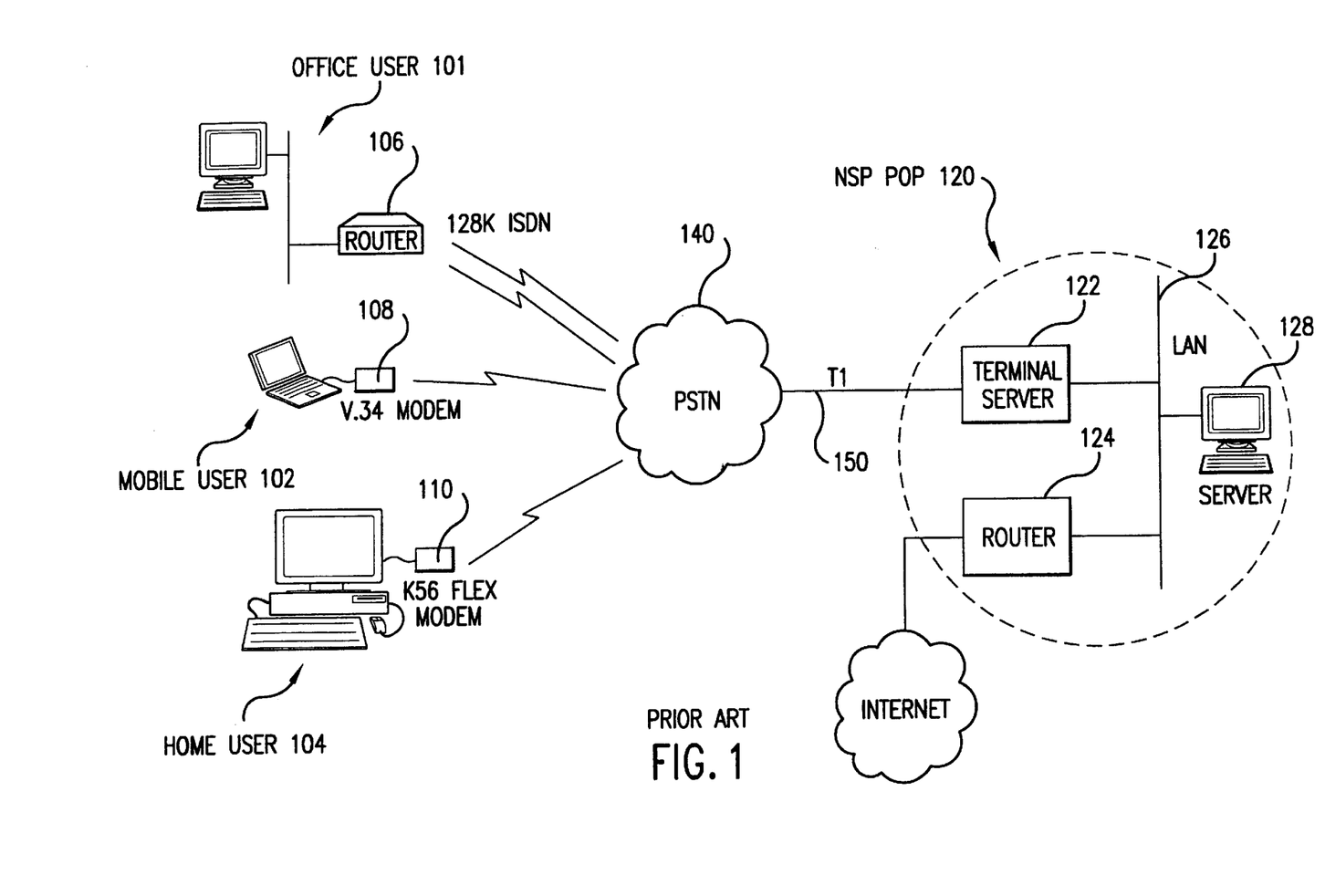
FIG. 1 is a network diagram illustrating a variety of users accessing the Internet through a NSP.

FIG. 1 is a network diagram illustrating a variety of users accessing the Internet through a typical NSP. As illustrated in FIG. 1, office user 101 utilizes a router 106 with an ISDN connection to gain network access, mobile user gains network access with a V.34 modem, and home user obtains network access using a 56 kilobits per second modem. Each of the users connect to the NSP point of presence (POP) 120 through the PSTN 140. NSP POP 120 includes a terminal server 122, a local area network (LAN) 126, a server 128 connected to the LAN 126, and a router 124. The terminal server 122 is connected to the PSTN 140 through T1 circuit 150. PSTN 140 time division multiplexes the data it receives from each user 101, 102, 104 onto T1 circuit 150. A T1 circuit in channelized form is a telephone circuit that can carry up to twenty four channels of time division multiplexed (TDM) data of any type (e.g., voice, text, and video). Consequently, a terminal server with a single T1 connection can receive channelized TDM data from twenty four separate users. NSPs utilize T1 circuits to reduce the number of phone lines that they have to purchase from the phone company. This provides a cost and management advantage.

Typically, terminal server 122 includes twenty four modems to process the twenty four possible simultaneous modem sessions that it could receive via a channelized T1 circuit 150. The terminal server processes the modem sessions to recover the data transmitted by the users. The user data is then encapsulated in a protocol and transmitted onto LAN 128. Router 124 receives the encapsulated user data and routes it through the Internet to the intended destination.

As Internet usage continues to grow dramatically, NSPs constantly need to keep pace with the increased demand. One way for the NSPs to accomplish this is simply to purchase additional T1 circuits from the phone company and purchase additional terminal servers to handle the increase in users. A problem with this approach is that the NSPs will have to manage multiple T1 circuits and multiple terminal servers.

What is needed is a single hardware unit that can process a great deal of simultaneous user sessions, provide scalability, and provide an easy migration path to new technologies.

SUMMARY OF THE INVENTION

The present invention provides a system for transmitting channelized time division multiplexed data between circuit boards within a housing. The present invention can be used to create a scalable remote access server for providing network access to a large number of users. The scalable remote access server also provides an easy migration path to new technologies.

A unique feature of the present invention is that the housing does not include a TDM bus for transmitting TDM data between the circuit boards placed in the housing. Rather, in one embodiment of the present invention, the housing includes a switch card for transmitting TDM data between any two circuit boards in the housing. The switch card includes a switching matrix having at least a first data port and a second data port. A first data bus connects a first circuit board within the housing to the first data port of the switching matrix, and a second data bus connects a second circuit board within the housing to the second data port of the switching matrix. The first circuit board transmits TDM data to the second circuit board by transmitting the TDM data together with a destination port identifier to the switching matrix. The destination port identifier identifies the data port of the switching matrix to which the second circuit board is connected. The switching matrix receives the TDM data and the destination port identifier from the first circuit board and then transmits the TDM data onto the bus connected to the port identified by the destination port identifier, thereby transmitting the TDM data from the first circuit board to the second circuit board.

A scalable remote access server that can process a large number of simultaneous user sessions and provide an easy migration path to new technologies is created by placing a first networking card in one of the slots of the housing and placing one or more second networking cards in one or more of the remaining slots.

A first networking card according to one embodiment of the present invention includes a first port adapted to connect to a communications circuit used to transmit a first signal. The first networking card also includes a demultiplexer that receives the first signal and extracts a set of second signals from the first signal. A packetizer within the first networking card receives the set of second signals. The packetizer includes a plurality of buffers for buffering data from each of the plurality of second signals. The data accumulated in each buffer is transmitted to the switching matrix together with a destination port identifier. The switching matrix forwards the data to one of the second networking cards based on the destination port identifier. The second networking cards further process the data.

A second networking card according to one embodiment includes a first port adapted to connect to the switching matrix, a T1 generator for creating a set of digital signals using the data received from the switching matrix, a multiplexer for multiplexing the set of digital signals onto a bus, and a plurality of modems and a high level data link control (HDLC) controller connected to the bus for processing the digital signals. The second networking card can also include a point-to-point protocol (PPP) processor and a router.

In one embodiment, the communications circuit that the first networking card is connected to is an optical facility, such as an optical fiber, and the first signal is an OC-3 formatted signal. In another embodiment the communications circuit is a T3 circuit, and the first signal is a formatted synchronous digital signal, such as a DS3 digital signal. A DS3 signal includes twenty-eight DS1 signals and each DS1 signal includes twenty-four DS0 signals. That is, twenty-four (24) DS0 signals are time division multiplexed to from the DS1 signal and twenty-eight (28) DS1 signals are time division multiplexed to from the DS3signal. A DS0 signal has a transmission rate of 64 kilobits per second (kbps). Each DS0 signal can be associated with a modem or ISDN session. Therefore, the first networking card can receive time division multiplexed (TDM) data from up to six-hundred-seventy-two modems or ISDN terminals. This data is transmitted through the switching matrix to one or more of the second networking cards. The second networking cards have processors for processing the TDM data and performing routing, among other functions. In this manner, the remote access server according to the present invention can provide a large number of users with network access.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention provides a system for transmitting data between circuit boards in a housing. The system can be used to create a scalable remote access server. The remote access server can be used by NSPs to provide its customers with connectivity to the Internet or other network.

As used herein and throughout, the term "data" includes any type of information, including video, voice, text, and image.

Figure 2:
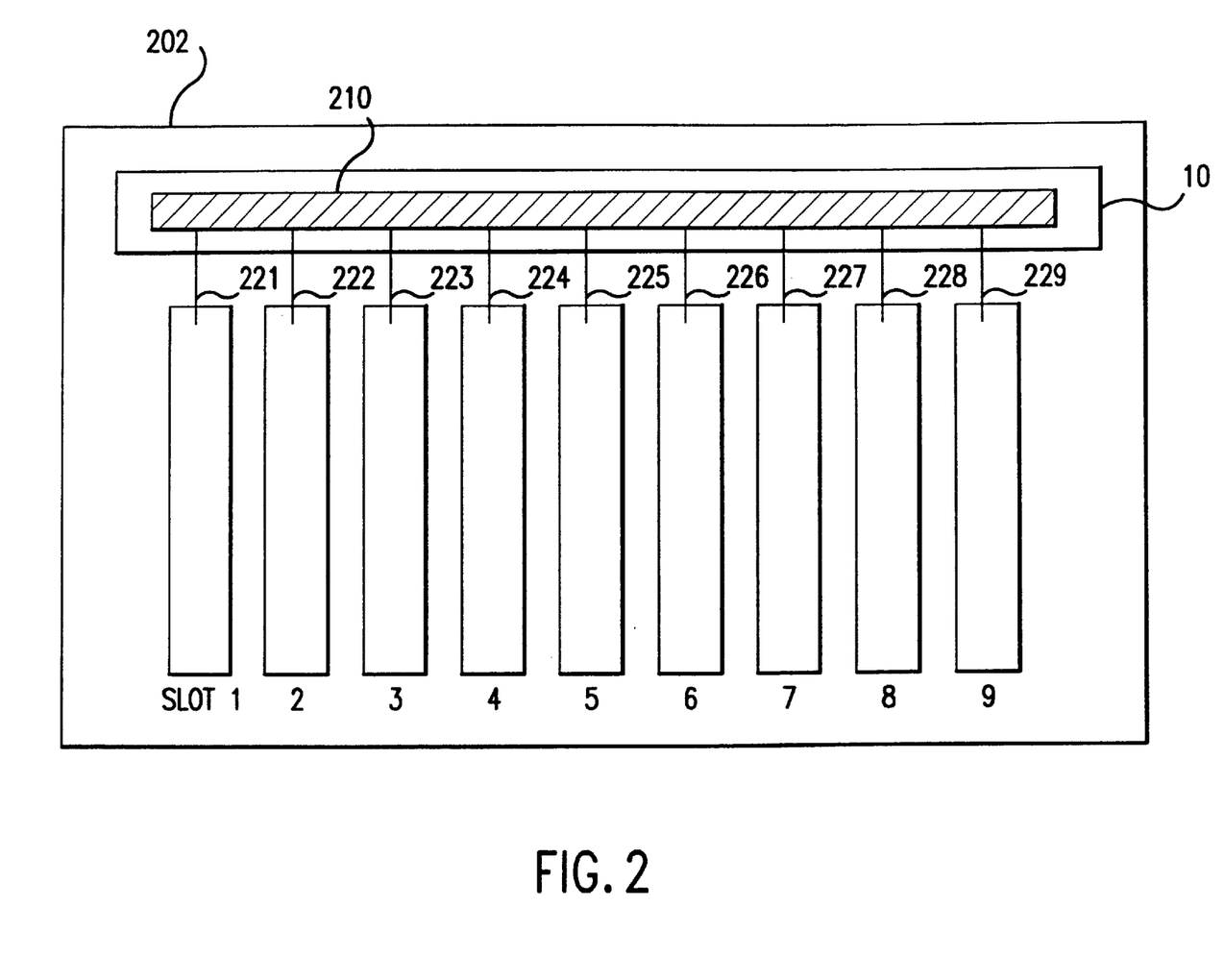
FIG. 2 is a diagram illustrating a first embodiment of the present invention.

As illustrated in FIG. 2, one embodiment of the present invention includes a housing 202 having ten slots 1–10 for holding ten circuit boards (i.e., cards). In a preferred embodiment, housing 202 is rack-mountable. A switch card 210 is the only mandatory card in the housing and it must be placed in slot 10. A variety of cards can be placed in slots 1 through 9. These cards include, but are not limited to, networking cards, such as: a T3 card, a T1/modem card, a SONET card, and an Ethernet card. As the names imply, a T3 card provides connectivity to a wide area network (WAN) via T3 circuits. A T1/modem card provides WAN connectivity via T1 circuits and provides modem and HDLC processing capability. An Ethernet card provides connectivity to an Ethernet based LAN. A T3 circuit is a digital carrier facility used to transmit a T3 data stream at 44.736 megabits per second. A T3 data stream is a DS3 formatted synchronous digital signal. A T1 circuit is a digital carrier facility used to transmit a T1 data stream at 1.544 megabits per second. A T1 data stream is a DS1 formatted synchronous digital signal.

As illustrated in FIG. 2, slots 1 through 9 of housing 202 are connected to slot 10 via data buses 221–229. Data buses 221–229 provide a data transmission path between cards placed in slots 1–9 and switch card 210, which is placed in slot 10. Data buses 221–229 can transmit data at up to 155 Megabits per second.

Figure 3:
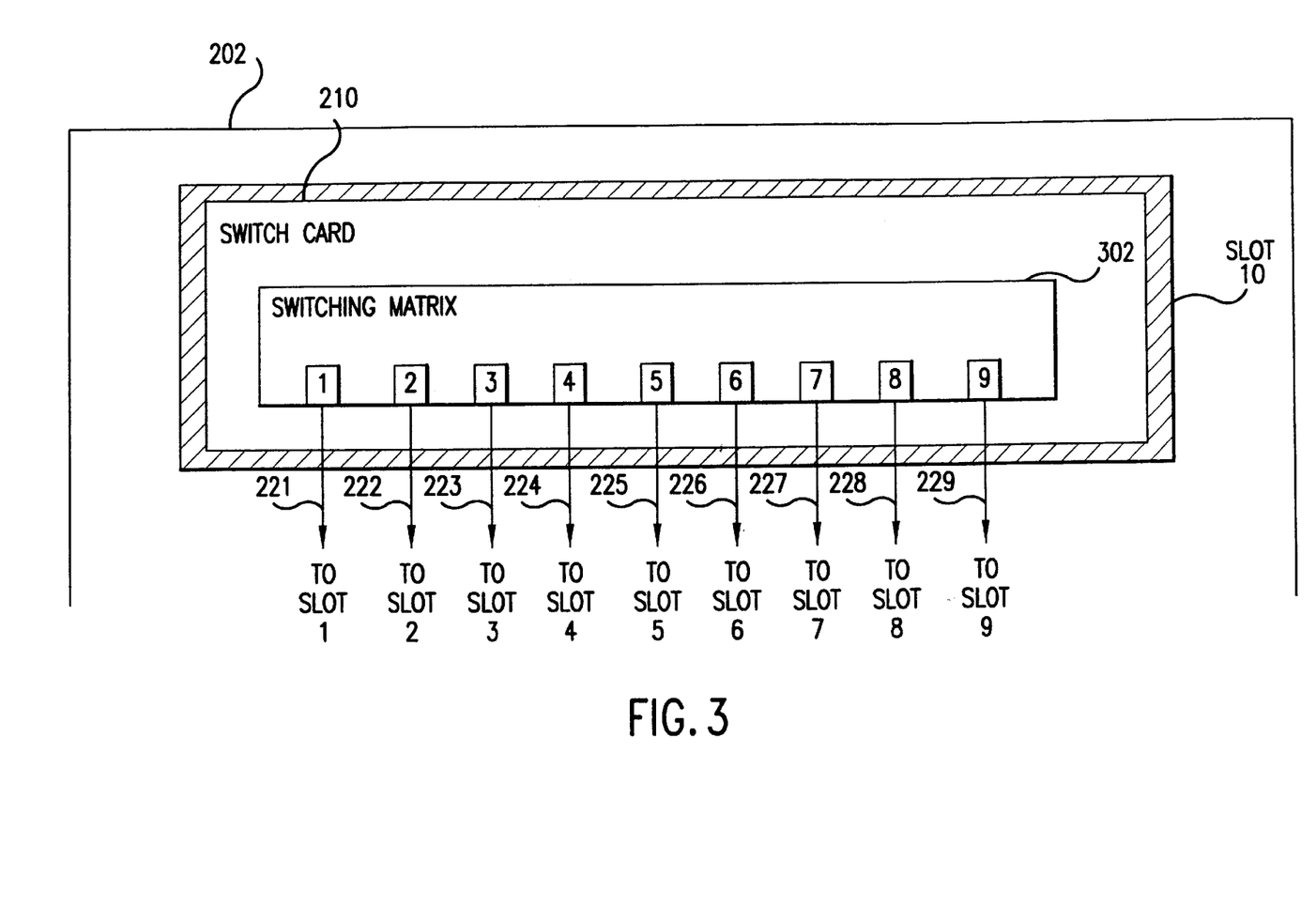
FIG. 3 is a diagram illustrating a switch card having a switching matrix.

A unique feature of the present invention is that housing 202 does not have a TDM bus for transmitting TDM data between the cards placed in the slots of housing 202. A TDM bus is a high-speed communications line to which individual components, especially networking cards, are connected. Instead of having a TDM bus, the present invention has a virtual backplane that can create a virtual dedicated connection between any cards in the housing as is desired. The virtual backplane is made possible by a five gigabit switching matrix 302, which is co-located on switch card 210, as illustrated in FIG. 3. A switching matrix, as used herein, is a device having a number of ports, wherein data received at a first port is transmitted out a destination port. The switching matrix determines the destination port by examining a header that is transmitted with the data received at the first port. The header contains a destination port identifier.

In one embodiment, switching matrix 302 includes nine ports 1–9. When switch card 210 is placed within slot 10 of housing 202, each port of switching matrix 302 is connected to one of the data buses 221–229 such that port 1 is connected to slot 1 via data bus 221, port 2 is connected to slot 2 via data bus 222, port 3 is connected to slot 3 via data bus 223, etc. When a card is placed within one of the slots 1–9, that card is connected to the corresponding port within switching matrix 302 via one of the data buses 221–229. For example, a T3 card placed in slot 1 will be connected to port 1 of switching matrix 302 via data bus 221, and a T1/modem card placed in slot 2 will be connected to port 2 of switching matrix 302 via data bus 222.

Like a TDM bus, switching matrix 302 provides a means for enabling the cards placed within the slots of housing 202 to transmit TDM data to each other. According to the present invention, all data communications between cards in the housing go though switching matrix 302.

For example, a first card (the source card) placed in slot 1 of housing 202 transmits TDM data to a second card (the destination card) placed in slot 2 of housing 202 by transmitting a data packet to port 1 of switching matrix 302 using data bus 221. In a preferred embodiment, the data packet is a fixed length data packet, which is sometimes referred to as a cell. Also in a preferred embodiment, the fixed length data packet has a fixed length header portion and a fixed length data portion. The data portion in the preferred embodiment is 48 bytes and the header is 5 bytes. The header portion of the data packet contains a destination port identifier that identifies the port of switching matrix 302 that the destination card is connected to. In this example, the header portion will identify port 2 because the destination card, which is placed in slot 2 of housing 202, is connected to port 2 of switching matrix 302. Switching matrix 302 receives the data packet from the first card and examines the data packet's header to determine which port is identified by the destination port identifier. The switching matrix 302 then transmits the data packet onto the bus connected to the port identified by the destination port identifier. In this manner, a virtual connection is established between the first card placed in slot 1 of housing 202 and the second card placed in slot 2 of housing 202, thereby allowing data communications between the two cards to take place.

In the preferred embodiment of the present invention, switching matrix 302 is implemented with an Asynchronous Transfer Mode (ATM) switching matrix. In particular, a memory based ATM switching matrix, such as the ATM2000 switching matrix sold by MMC Network, is used to implement switching matrix 302.

Figure 4:
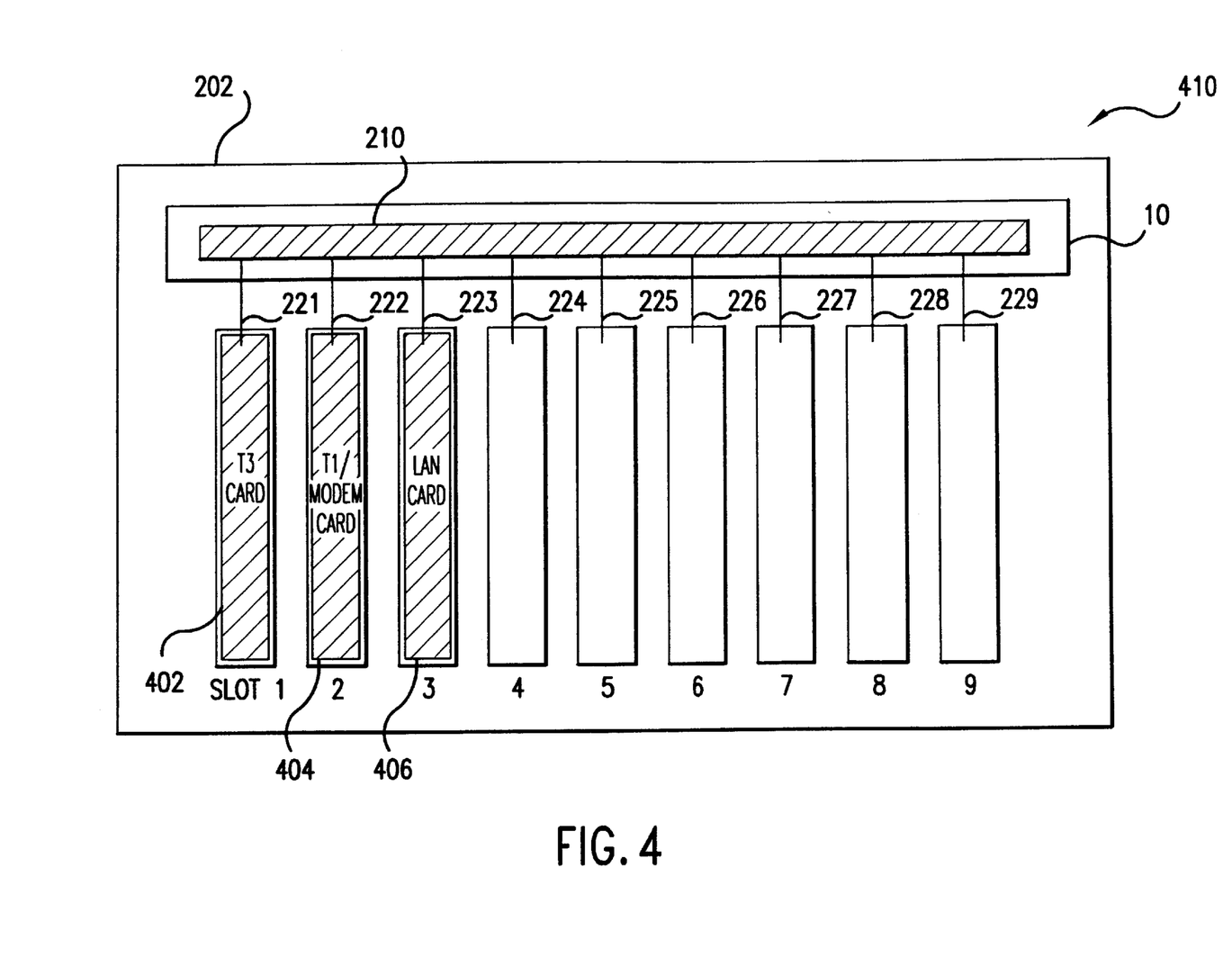
FIG. 4 is a diagram illustrating a scalable remote access server.

The virtual backplane architecture according to the present invention can be used to create a scalable remote access server for providing network access to a large number of users. As illustrated in FIG. 4, a remote access server, according to one embodiment of the present invention, is created by inserting a T3 card 402 into slot 1 of housing 202, inserting a T1/modem card 404 into slot 2 of housing 202, and by inserting local area network card (LAN) card 406 into slot 3 of housing 202. LAN card 406 can be an Ethernet card or Token Ring card, for example. These cards transmit data to each other using switching matrix 302 as described above. It should be noted that the slot selection is arbitrary. Anyone of the above three mentioned cards could have been placed in any one of slots 1–9.

Figure 5:
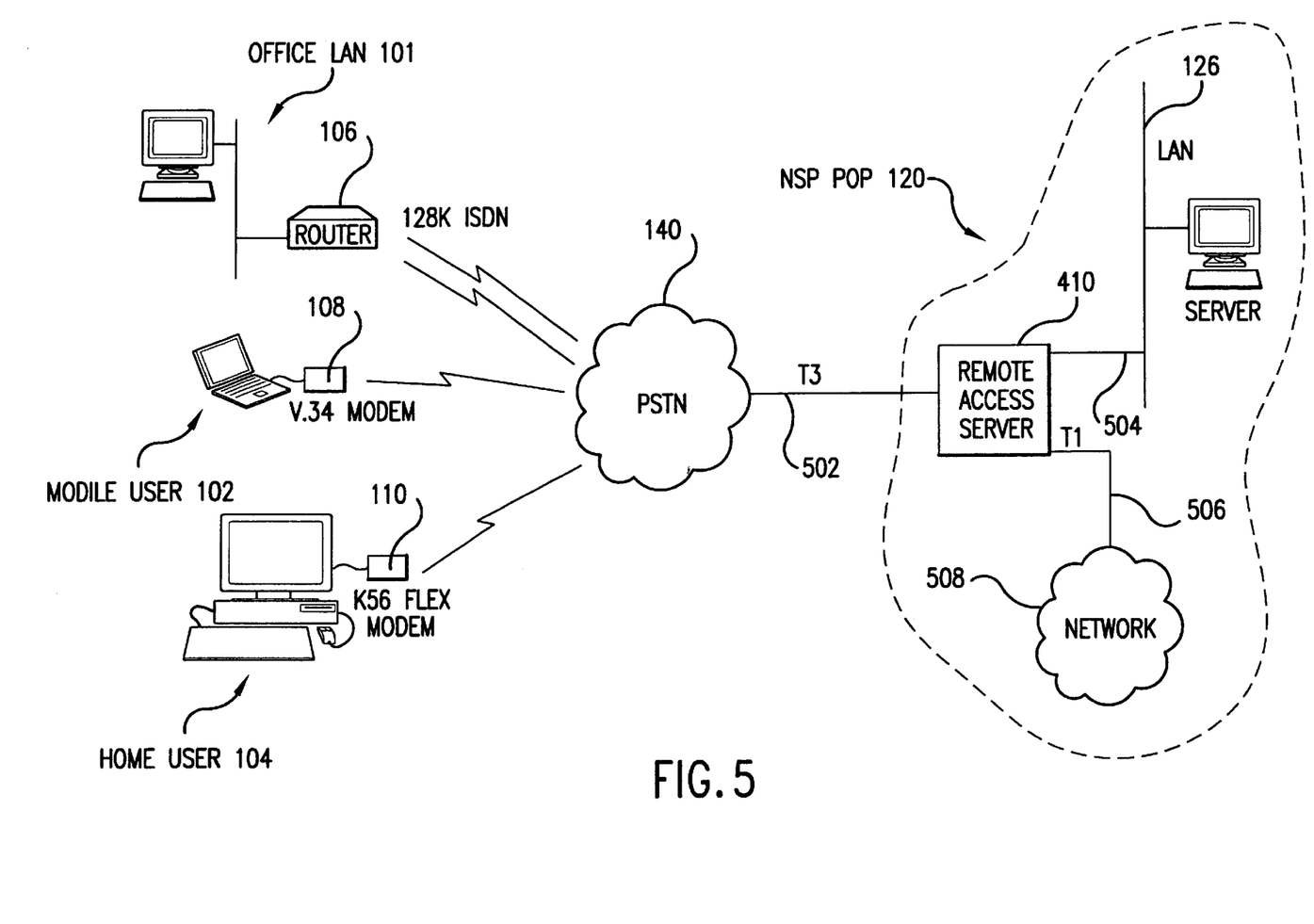
FIG. 5 is a diagram illustrating a variety of users accessing a network using the scalable remote access server of FIG. 4.

FIG. 5 illustrates remote access server 410 providing users 101, 102, and 104 with access to network 508. Network 508 could be the Internet or a private data network, for example. As shown in FIG. 5, remote access server 410 is connected to PSTN 140 via T3 circuit 502, LAN 126 via connection 504, and network 508 via T1 circuit 506. Specifically, T3 circuit 502 is connected to T3 card 402, T1 circuit 506 is connected to T1/modem card 404, and connection 504 is connected to LAN card 406.

T3 circuit 502 is the equivalent of 28 T1 circuits. That is, the telephone company time division multiplexes 28 T1 circuits to form T3 circuit 502. Since a channelized T1 circuit can carry up to twenty four 64 kbps channels, a T3 circuit can carry up to six hundred seventy-two (28×24=672) 64 kbps channels. Each 64 kbps channel can carry a user modem or ISDN session. Thus, data from six hundred seventy-two separate users can be carried by T3 circuit 502. Before remote access server 410 can connect the up to 672 separate users to network 508, remote access server 410 must first digitally process each of the 64 kbps channels. In particular, the modem sessions must be demodulated and the ISDN sessions need to be processed by an HDLC controller. Because it is currently unfeasible to process data traffic from up to 672 users on the T3 card 402, one or more T1/modem cards 404 are inserted into the remote access server 410 to perform the data processing function. TDM data transmitted over T3 circuit 502 is received by T3 card 402 and transmitted through switch card 210 to T1/modem card 404, thereby enabling the T1/modem card 404 to process at least a portion of the TDM data carried by T3 circuit 502.

Figure 6:
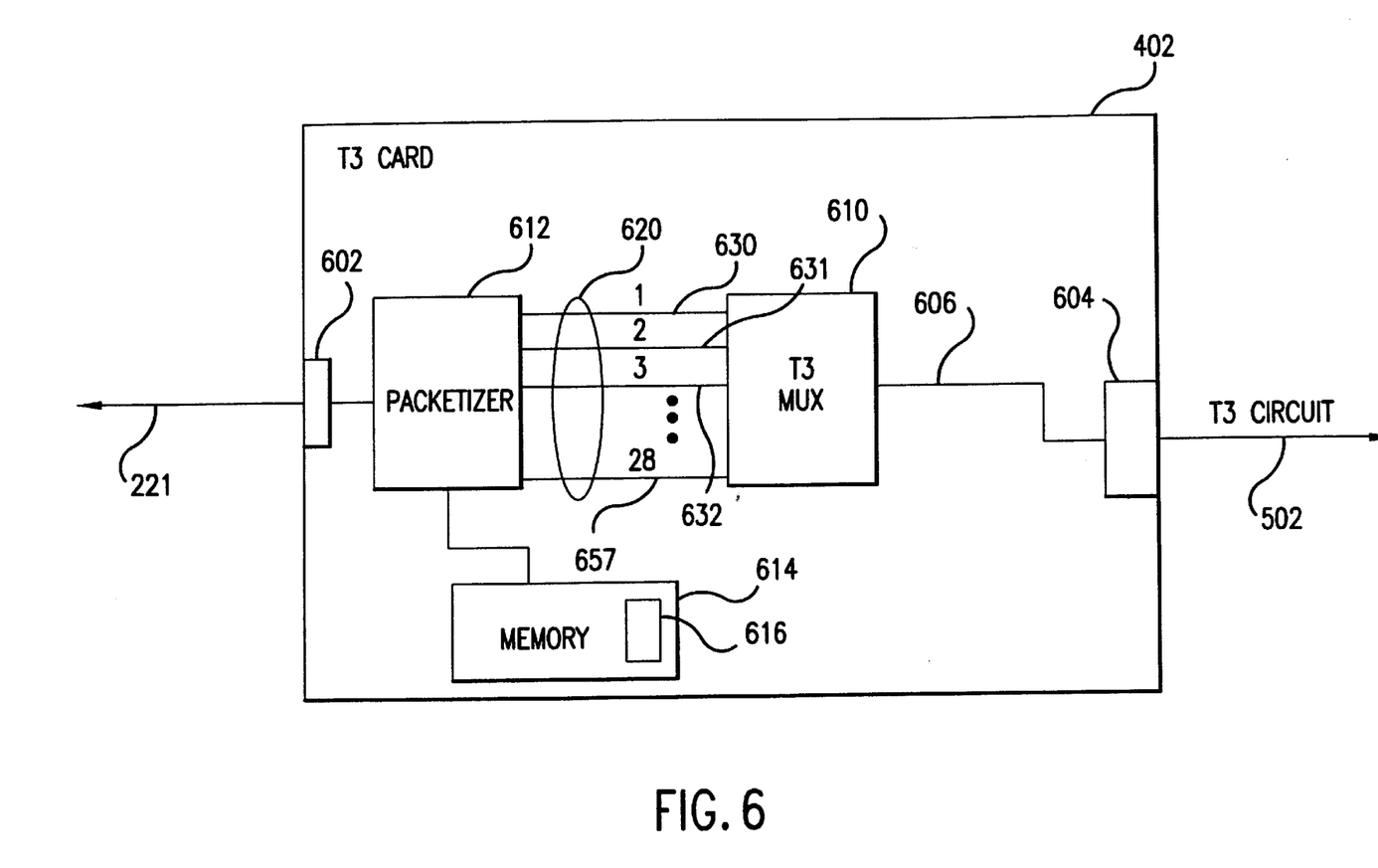
FIG. 6 is a diagram illustrating a T3 networking card.

FIG. 6 illustrates one embodiment of T3 card 402. T3 card 402 includes two input/output ports 602 and 604. Port 604 is a T3 circuit port that connects T3 card 402 to T3 circuit 502. Port 602 is a port for connecting the T3 card to a port in the switching matrix using data bus 221. T3 card 402 is connected to data bus 221 because the card is placed in slot 1, as shown in FIG. 4.

T3 card 402 further includes a T3 multiplexer/demultiplexer (MUX) 610, a packetizer 612, and a memory 614. T3 MUX 610 demultiplexes a T3 data stream 606 to extract the 28 T1 data streams 620 that comprise T3 data stream 606. Because T3 card 402 does not include a device to process the TDM data traffic transmitted on T3 circuit 502, each of the active T1 data streams must be associated with and distributed to a T1/modem card 404 for processing. That is, data from each of the active T1 data streams must be processed by a demodulator, HDLC controller or other processor. An active T1 data stream is a data stream containing TDM data. Its possible that only one of the T1 data streams within T3 circuit 502 is active. In this case, only that T1 data stream need be processed.

Current T1/modem cards can process up to ninety-six 64 kbps data signals. Since a T1 data stream consists of only twenty-four DS0 data signals and a DS0 signal has a transmission rate of 64 kilobits per second, four T1 data streams can be processed by one T1/modem card (4×24=96). Memory 614 contains a configuration file 616 for associating each one of the active twenty-eight T1 streams 620 with a T1/modem card that is placed within remote access server 410. That is, for each active T1 data stream the configuration file contains an entry that associates an active T1 data stream with a T1/modem card within remote access server 410.

The number of T1/modems cards that are placed within remote access server 410 depends on the expected number of simultaneous users. As the number of expected simultaneous users grow, the growth can be accommodated by simply placing additional modem cards into the empty slots of remote access server 410. In this manner, remote access server 410 provides scalability. When remote access server 410 is configured with a T3 card and an Ethernet card, there are seven available slots for holding T1/modem cards. When all seven available slots are configured with T1/modem cards, remote access server is capable of processing 672 DS0 data signals (7×96=672), which is the number of DS0 data signals in a fully loaded T3 circuit, because each T1/modem card can process up to 96 DS0 data signals.

The twenty-eight T1 data streams 620 produced by MUX 610 are inputted into Packetizer 612. Packetizer 612 contains twenty eight buffers (not shown). There is one buffer for each of the twenty-eight T1 data streams 620. Each buffers is at least forty-eight bytes wide. As data bytes arrive at the packetizer 612 on each of the active T1 data streams, the data bytes are placed in a corresponding buffer. For a T1 stream, data bytes arrive at the rate of 193 kilobytes per second. Therefore, it takes 0.248 milliseconds to fill each buffer. Once a buffer is full, the packetizer 612 adds a five byte header to the data in the buffer. The header contains a destination port identifier that identifiers the port of switching matrix 302 that is connected to the T1/modem card that is associated with the T1 stream corresponding to the buffer. As stated above, memory 614 stores configuration file 616, which contains an entry that associates an active T1 data stream with a T1/modem card. Packetizer 612 accesses this file in creating the headers. By adding a header to a buffer, a data packet is created. Packetizer 612 may be implemented with an ASIC or with a general purpose processor controlled by software that performs the above functions.

After a header is added to a buffer, the data packet that is created is transmitted over data bus 221 to switching matrix 302. As discussed above, switching matrix 302 examines the header to determine which ports is identified by the destination port identifier transmitted in the header. Switching matrix 302 then transmits the data packet onto the bus connected to the identified port. In this manner, a virtual dedicated bus is established between T3 card 402 and T1/modem card 404.

Figure 7:
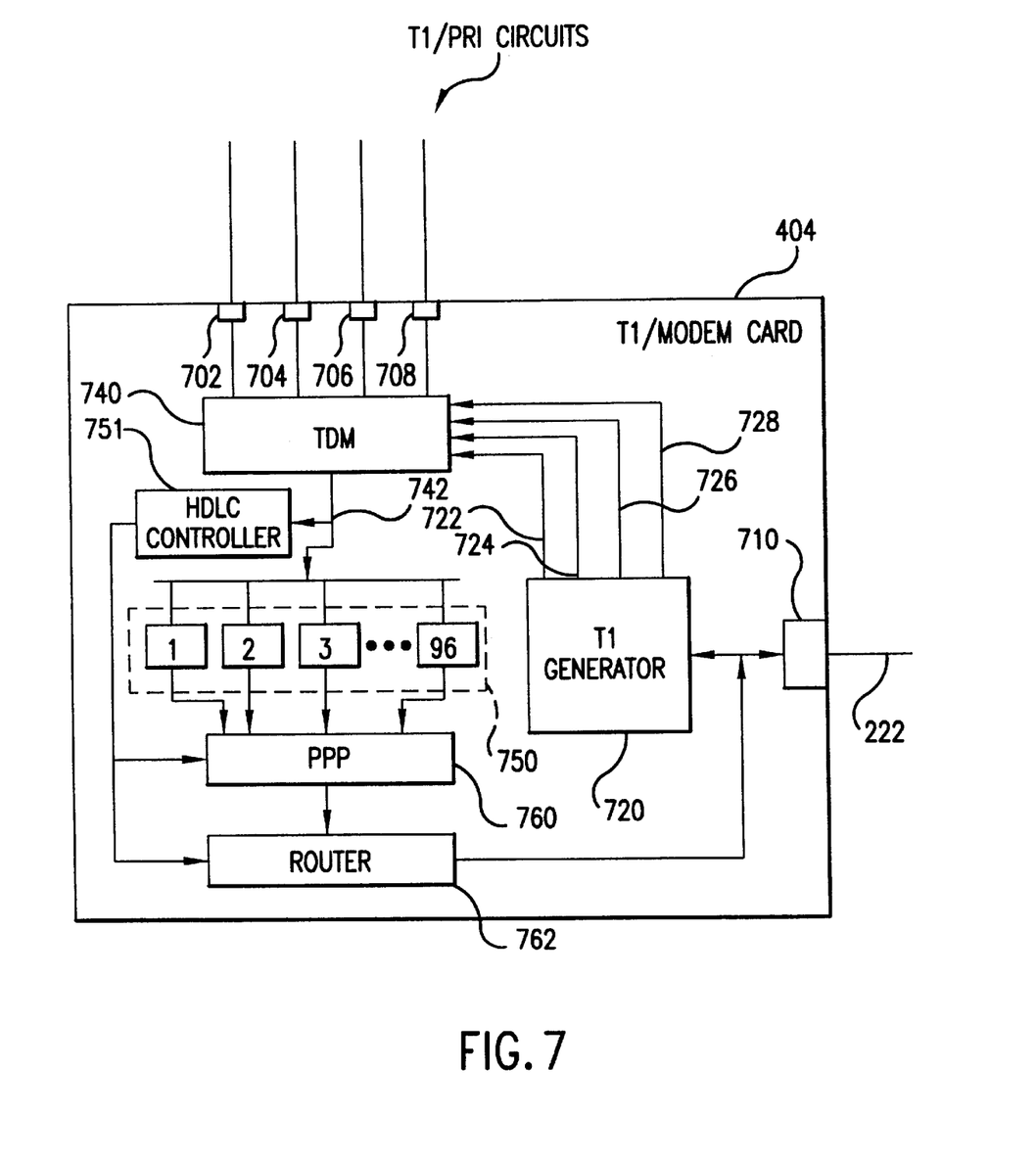
FIG. 7 is a diagram illustrating a T1/modem networking card.

FIG. 7 illustrates one embodiment of T1/modem card 404. T1/modem card 404 includes five data ports 702, 704, 706, 708, 710. Data ports 702, 704, 706 and 708 are for receiving four T1 or four primary rate interface (PRI) circuits. Data port 710 is for connecting T1/modem card 404 to switching matrix 302 via data bus 222.

A data packet received by T1/modem card 404 from T3 card 402 via switching matrix 302 is first processed by T1 generator 720. T1 generator 720 removes the header from the data packet and transmits the TDM data contained within the data portion of the data packet onto one of the data buses 722, 724, 726, or 728 according to the DS1 format, thereby creating a T1 signal. T1 generator may be implemented with an ASIC or with a general purpose processor controlled by software that performs the above functions.

The data bus that is used depends on the T1 data stream 630, 631, 632, or 657 to which the data packet corresponds. In this embodiment of the present invention, a data packet received at T1/modem card 404 will correspond to T1 data stream 630, 631, 632, or 657. The TDM data from a data packet is placed on the data bus that is associated with the same T1 data stream that the data packet is associated with. In this embodiment of the present invention data bus 722 is associated with T1 data stream 630; data bus 724 is associated with T1 data stream 631; data bus 726 is associated with T1 data stream 632; data bus 728 is associated with T1 data stream 657.

Data buses 722, 724, 726, 728 connect T1 generator 720 to time-division-multiplexer (TDM) 740. TDM 740 multiplexes the T1 streams arriving on data buses 722, 724, 726, 728 onto TDM bus 742. The data is then transferred off TDM bus 742 to modems 750 or HDLC controller 751. In this manner, the DS0 signals carried by T3 circuit 502 are transferred from T3 card 402 to T1/modem card 404 where they are demodulated by modems 750 or processed by HDLC controller 751. As shown in FIG. 7, T1/modem card 404 contains ninety-six modems. In a preferred embodiment, modems 750 are digital modems implemented with a digital signal processor programmed to demodulate data transmitted by a modem through a telephone network.

T1/modem card 404 further includes processor 760 for performing point-to-point protocol (PPP) processing and processor 762 for performing routing functions. After data is processed by modems 750 or HDLC controller 751, the data is PPP processed by processor 760. Lastly, the data is routed by processor 762 to other cards within the server, such as LAN card 496, and ultimately to network 508.

An advantage of the remote access server according to the present invention is that it is completely scalable and provides a migration path to new modem technologies. As modem technology improves such that more than 96 modems can be placed on a modem card, the present invention can take advantage of this technological improvement without having to modify any hardware in the system. For example, if a new modem card is developed such that it can hold 192 modems, all that one has to do to take advantage of this is to replace an old 96 modem card with the new 192 modem card and change the configuration file in the T3 card to associate 8 T1 data streams with the new 192 modem card. Currently the T3 card associates at most four T1 data streams to a modem card because modem cards can only hold up to 96 modems. But when a modem card can hold up to 192 modems, the T3 can be configured by the configuration file to associate 8 T1s to a single modem card.

The effect of associating a greater number of T1 data streams with a single modem card is that fewer modem cards will be necessary, which will free up slots in the housing for holding other networking cards.

While various embodiments of the present invention have been described above, it should be understood that they have been presented by way of example, and not limitation. It will be understood by those skilled in the relevant art that various changes in form and detail may be made therein without departing from the spirit and scope of the invention as defined by the following claims. Thus the breadth and scope of the present invention should not be limited by any of the above-described exemplary embodiments, but should be defined only in accordance with the following claims and their equivalents.

What is claimed is:

1. A system for transmitting time domain multiplexed (TDM) data between a first and a second circuit board with a housing, comprising:

a switch card placed within the housing, said switch card including a switching matrix having a first data port and a second data port for receiving data packets;

a first data bus to connect the fist circuit board to said first data port; and a second data bus to connect the second circuit board to said second data port;

wherein the first circuit board transmits TDM data to the second circuit board by transmitting a data packet to said switching matrix over said fist data bus, said data packet including said TDM data and a data port identifier identifying said second data port;

wherein the first circuit board includes a first port coupled to said first data port of said switching matrix via said first data bus and a second port adapted to connect to a communications circuit for transmitting a communications signal;

wherein said communications circuit is a digital T3 circuit; and wherein said switching matrix receives said data packet from said first circuit board at said first data port and transmits said TDM data out the data port identified by said data port identifier, thereby transmitting said TDM data between the first and second circuit board.

2. A system for transmitting time domain multiplexed (TDM) data between a first and a second circuit board within a housing, comprising:

a switch card placed within the housing, said switch card including a switching matrix having a first data port and a second data port for receiving data packets;

a first data bus to connect the first circuit board to said first data port; and a second data bus to connect the second cit board to said second data port;

wherein the first circuit board transmits TDM data to the second circuit board by transmitting a data packet to said switching matrix over said first data bus, said data packet including said TDM data and a data port identifier identifying said second data port;

wherein the first circuit board includes a first port coupled to said first data port of said switching matrix via said first data bus and a second port adapted to connect to a communications circuit for transmitting a communications signal;

wherein said communications signal is a formatted synchronous digital signal of the DS3 format; and wherein said switching matrix receives said data packet from said first circuit board at said first data port and transmits said TDM data out the data port identified by said data port identifier, thereby transmitting said TDM data between the first and second circuit board.

3. A networking card, comprising:

means for receiving a data packet from a switching matrix, said data packet including a data portion and a header portion, said data portion including data transmitted from a data communication device;

means for creating a signal for transmitting said data transmitted from said data communication device; and a processor to receive said signal and to process said data transmitted from said data communication device.

4. The networking card of claim 3, further comprising a point-to-point-protocol processor coupled to said processor.

5. The networking card of claim 3, further comprising a router coupled to said processor.

6. The networking card of claim 3, wherein said processor is a modem.

7. The networking card of claim 3, wherein said processor is a high level data link control (HDLC) controller.

8. The networking card of claim 3, wherein said processor is a digital signal processor.

9. The networking card of claim 3, wherein said data communication device is a modem.

10. The networking card of claim 3, wherein said data communication device is an integrated services digital network communication device.

11. The networking card of claim 3, wherein said signal is a formatted synchronous digital signals.

12. The networking card of claim 11, wherein said formatted synchronous digital signal is of the DS1 type.

13. A scalable remote access communications server for providing remote users with access to a network, comprising:

a housing having a plurality of slots defined therein, including a fist, second, and third slot;

a switch card placed within said first slot, said switch card including a switching matrix having a first port and a second port;

a first networking card placed in said second slot and coupled to said first port of said switching matrix; and a second networking card placed in said third slot and coupled to said second port of said switching matrix;

wherein TDM data is transmitted from said first networking card to said second networking card through said switching matrix;

and wherein said first networking card comprises:

a first port adapted to connect to a communications circuit used to transmit a first signal; and a second port adapted to connect to said switching matrix, wherein data packets are transmitted from said second port to said switching matrix;

a demultiplexer to extract a plurality of second signals from said first signal; and a packetizer receiving one of said plurality of second signals, wherein said packetizer includes a buffer for buffering data from said one of said plurality of second signals to create a data packet.

14. A scalable remote access communications server for providing remote users with access to a network, comprising:

a housing having a plurality of slots defined therein, including a first, second, and third slot;

a switch card placed within said first slot, said switch card including a switching matrix having a first port and a second port;

a first networking card placed in said second slot and coupled to said first port of said switching matrix; and a second networking card placed in said third slot and coupled to said second port of said switching matrix;

wherein TDM data is transmitted from said first networking card to said second networking card through said switching matrix;

and wherein said second networking card comprises:

means for receiving a data packet from said switching matrix, said data packet including a data portion and a header portion, said data portion including data transmitted from a data communication device;

means for creating a signal for transmitting said data transmitted from said data communication device; and a processor to receive said signal and to process said data transmitted from said data communication device.

\* \* \* \* \*